United States Patent
Qu et al.

(10) Patent No.: US 7,923,419 B2
(45) Date of Patent: Apr. 12, 2011

(54) METHODS AND COMPOSITIONS FOR THERMAL INSULATION

(75) Inventors: Qi Qu, Spring, TX (US); Xiaolan Wang, Baton Rouge, LA (US)

(73) Assignee: Baker Hughes Incorporated, Houston, TX (US)

( * ) Notice: Subject to any disclaimer, the term of this patent is extended or adjusted under 35 U.S.C. 154(b) by 1498 days.

(21) Appl. No.: 11/015,928

(22) Filed: Dec. 17, 2004

(65) Prior Publication Data

US 2006/0131536 A1 Jun. 22, 2006

(51) Int. Cl.
*C09K 8/60* (2006.01)

(52) U.S. Cl. ......... 507/261; 507/236; 507/239; 166/302

(58) Field of Classification Search ............... 507/261, 507/236, 239; 166/302
See application file for complete search history.

(56) References Cited

U.S. PATENT DOCUMENTS

| | | | | |
|---|---|---|---|---|
| 4,223,732 | A * | 9/1980 | Carriay et al. | 166/291 |
| 4,296,814 | A * | 10/1981 | Stalder et al. | 166/303 |
| 5,785,747 | A * | 7/1998 | Vollmer et al. | 106/194.2 |
| 6,080,704 | A * | 6/2000 | Halliday et al. | 507/136 |
| 6,258,859 | B1 | 7/2001 | Dahayanake et al. | |
| 6,302,209 | B1 | 10/2001 | Thompson, Sr. et al. | |
| 6,435,277 | B1 | 8/2002 | Qu et al. | |
| 6,482,866 | B1 | 11/2002 | Dahayanake et al. | |
| 6,569,814 | B1 | 5/2003 | Brady et al. | |
| 6,605,570 | B2 | 8/2003 | Miller et al. | |
| 6,613,720 | B1 | 9/2003 | Feraud et al. | |
| 6,637,517 | B2 | 10/2003 | Samuel et al. | |
| 6,703,352 | B2 | 3/2004 | Dahayanake et al. | |
| 6,762,154 | B2 | 7/2004 | Lungwitz et al. | |
| 2003/0166471 | A1 * | 9/2003 | Samuel et al. | 507/200 |
| 2003/0236174 | A1 | 12/2003 | Fu et al. | |
| 2004/0063587 | A1 * | 4/2004 | Horton et al. | 507/100 |
| 2004/0138070 | A1 * | 7/2004 | Jones et al. | 507/112 |

OTHER PUBLICATIONS

Schlumberger glossary pictorial of a mechanical packer.*
Javora, P.H., et al., "Water-Based Insulating Fluids for Deep-Water Riser Applications," Oct. 2004, SPE 88547, Society of Petroleum Engineers, Inc., USA.
Wang, X., et al., "A New Thermal Insulating Fluid and Its Application in Deepwater Riser Insulation in the Gulf of Mexico," Oct. 2003, SPE 84422, Society of Petroleum Engineers, Inc., USA.

* cited by examiner

*Primary Examiner* — Randy Gulakowski
*Assistant Examiner* — Alicia Toscano
(74) *Attorney, Agent, or Firm* — John Wilson Jones; Jones & Smith, LLP

(57) ABSTRACT

Unwanted heat loss from production tubing or uncontrolled heat transfer to outer annuli is inhibited by introduction into the annuli a thermal insulating packer fluid or a riser fluid containing a zwitterionic surfactant, an alcohol and a brine. The viscosity of the composition is sufficient to reduce the convection flow velocity within the annulus. The invention has particular applicability with high density brines.

29 Claims, 1 Drawing Sheet

US 7,923,419 B2

METHODS AND COMPOSITIONS FOR THERMAL INSULATION

FIELD OF THE INVENTION

This invention relates to enhancement of the thermal insulation of production tubing or a transfer pipe by use of a thermal insulating composition in surrounding annuli which contains a zwitterionic surfactant, alcohol and brine. The fluid viscosity of the composition is capable of reducing the convection flow velocity within the surrounding annulus of the well or transfer pipe being treated.

BACKGROUND OF THE INVENTION

Undesired heat loss from production tubing as well as uncontrolled heat transfer to outer annuli can be detrimental to the mechanical integrity of outer annuli, cause productivity losses from the well due to deposition of paraffin and asphaltene materials, accelerate the formation of gas hydrates, and destabilize the permafrost in arctic type regions.

The successful application of wellbore insulating fluids in the last several years has shown that such fluids can minimize the heat loss. Silicate foams were among the first insulating fluids. Such foams were employed in steam injection applications wherein a solution of sodium silicate was placed in a packed-off annulus, and then steam was injected down the tubing. The hot tubing caused the silicate solution to boil, leaving a coating of insulating material, silicate foam of ¼ to ½ inch thick, on the hot tubing surface. Silicate solution that remained in the annulus after steaming for several hours was removed from the annulus by displacing it with water which was removed by gas-lifting or swabbing. The foam insulator exhibited thermal conductivity of about 0.017 Btu/(hr·ft·° F.). However, difficulties were encountered in boiling off the solutions to form the foam. "Hot spots" were also observed to develop adjacent to the uninsulated couplings.

To prevent thermal refluxing, an insulating fluid that filled the entire annulus was chosen as an alternative to the gas filled annulus. Such fluids avoided unwanted heat loss as a result of reduced thermal conduction and/or convection. Oils, such as gelatinous oil based fluids, exhibited relatively low thermal conductivity (0.08 Btu/(hr·ft·° F.). For instance, the relative thermal conductivity of this type of fluid was approximately 13 percent that of water. However, environmental restrictions limited the application of such oils. Furthermore, the long-term incompatibility with various elastomers presented concerns.

As an alternative to chemical methods, vacuum insulated tubing was proposed to solve the problem of paraffin deposition in the production tubing. While insulated tubing proved to be an effective method for wellbore insulation, actual heat losses were significant. Heat loss through couplings and other internal structures such as centralizers and valves were seen to account for up to 50 percent of the total heat loss. To fully achieve the potential of insulated tubing, selected rubber-insulated couplings were tested along with a thermal pipe coating. Although improved thermal performance was obtained, maintaining the annulus dry over a long period was difficult, and, heat loss through refluxing could still occur because of damaged and scraped coating, and downhole centralizers, valves and gauges. This problem could be controlled effectively by the use of specially designed aqueous-based (oil-free) insulating fluids.

To secure the insulation of wellbore to reduce the heat transfer from the production tubing to the surrounding wellbore, internal annuli, and the riser environment, non-crosslinked insulating fluids, such as those disclosed in U.S. Pat. No. 6,489,270, proved to be non-damaging, environmentally friendly, and highly insulating. The viscosity of such fluids made it easy to blend and pump them into the annulus; the fluid density being controlled by the amount and type of dissolved salt needed to provide positive control of the wellbore pressure without the risk of solid settling and separation. Such fluids, when added either into an annulus or riser, effectively reduced undesired heat loss from the production tubing, or heat transfer to outer annuli. In some cases, heat loss from the produced fluids due to conduction and convection was reduced by more than 90% when compared with conventional packer fluids.

Other fluids, such as those disclosed in U.S. Patent Application 20040059054 were formulated to provide a viscous fluid with inherently low thermal conductivity and low convection velocity by mixing a designated amount (0.1 to 10%) of polysaccharide and superabsorbent polymers of starch grafted polyacrylates, acrylamide/acrylic acid copolymers, isobutylene/maleic anhydride, etc. into a brine mixture.

To date, such insulating fluid systems have been successful for those applications wherein the density of the brine is below 12.5 lb/gal (e.g., sodium salts). Improved insulation properties in fluids based on higher density brines (such as calcium bromide brines) have been sought. Such fluids need to be environmentally friendly, exhibit an inherently low thermal conductivity and must be capable of securing the insulation of the wellbore while reducing the amount of heat transfer from the production tubing to the surrounding wellbore, internal annuli, and riser.

SUMMARY OF THE INVENTION

The invention relates to the use of a thermal insulating composition to control the heat transfer from production tubing or transfer pipe to one or more surrounding annuli and the environment. The composition used in the invention exhibits enhanced thermal control and is particularly effective for deepwater risers and for those applications where heavier brines, i.e., above 12.5 lb/gal, are desired.

The composition used in the invention contains a zwitterionic surfactant, alcohol and brine. The composition may further contain a viscosifying polymer.

The compositions used in the invention provide high viscosity at low shear rate range to reduce convection flow velocity within the annulus. In addition, such compositions provide lower viscosity at high shear rate range to facilitate the fluid placement.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
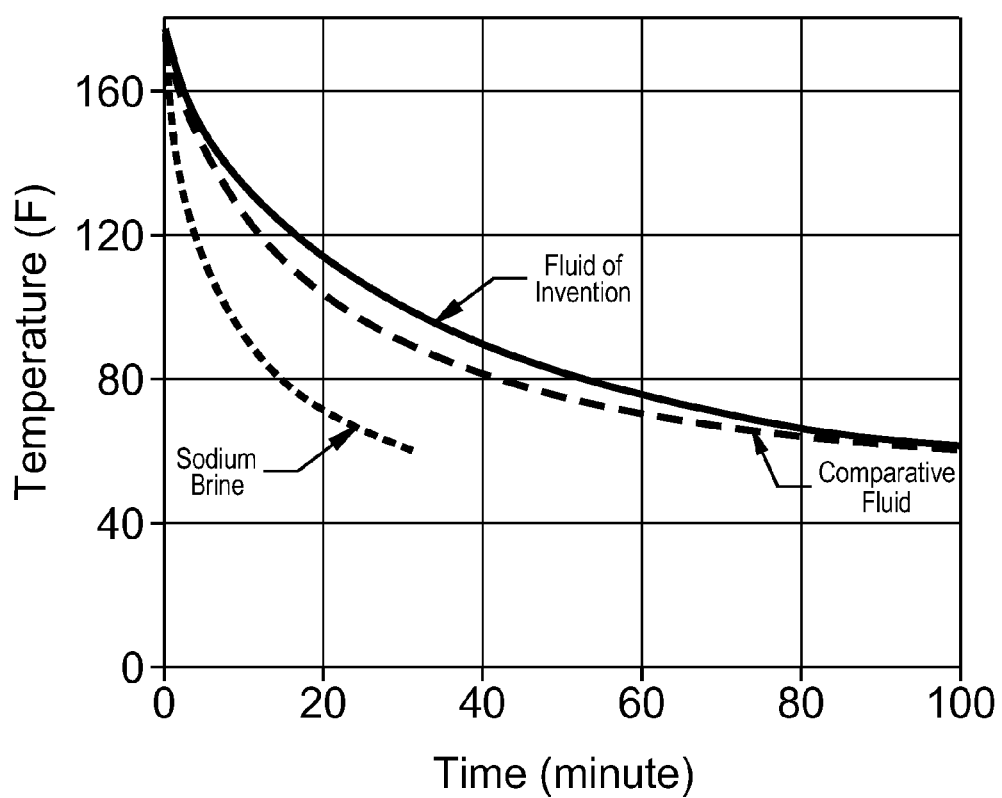
FIG. 1 illustrates the temperature decrease profile exhibited by the composition used in the invention versus the compositions of the prior art.

The thermal insulating composition used in the invention contains at least one zwitterionic surfactant. In addition, the composition may contain an alcohol and brine and/or a viscosifying polymer. The viscosity of the composition is sufficient to reduce the convection flow velocity within the annulus and immobilize the water and/or brine. The thermal insulating fluid of the invention is easy to blend and pump at the rigsite.

The composition of the invention may further, optionally, contain a polyol, buffer, biocide and/or corrosion inhibitor. The biocides as well as buffers and corrosion inhibitors suitable for use in the invention are those known in the art and are employed in amounts recognized in the art.

The invention is preferably practiced without the use of a co-surfactant. When present, the co-surfactant may be an anionic surfactant, such as a sulfate or carboxylate.

Examples of zwitterionic surfactants are:
(a) betaines of the formula:

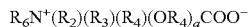

$$R_6N^+(R_2)(R_3)(R_4)(OR_4)_aCOO^-$$

wherein $R_6$ represents an alkyl, alkylarylalkyl, alkoxyalkyl, alkylaminoalkyl, alkylamidoalkyl, or alkylamidoalkoxy group wherein the number of carbon atoms in $R_6$ is between from about 11 to about 24 carbon atoms, preferably from 11 to 17, most preferably from 15 to 17, carbon atoms (the alkyl groups may be branched or straight chained and may be saturated or unsaturated). Representative groups of $R_6$ include tetradecyl, hexadecyl and heptadecyl;

$R_2$ and $R_3$ are independently an aliphatic chain e.g., alkyl, alkenyl, arylalkyl, hydroxyalkyl, carboxyalkyl, alkylene carboxylic and hydroxyalkyl-polyoxyalkylene, e.g. hydroxyethyl-polyoxyethylene or hydroxypropyl-polyoxypropylene having from 1 to about 30 atoms, preferably from about 1 to about 20 atoms, more preferably from about 1 to about 10 atoms and most preferably from about 1 to about 6 atoms in which the aliphatic group can be branched or straight chained, saturated or unsaturated. Preferred alkyl chains are methyl, ethyl, preferred arylalkyl is benzyl, and preferred hydroxyalkyls are hydroxyethyl or hydroxypropyl, while preferred carboxyalkyls are acetate and propionate;

each $R_4$ is independently an alkylene group with chain length 1 to 4. Preferred are methylene or ethylene groups; and a is 0 to about 4.

Examples of betaines include those of the structural formula

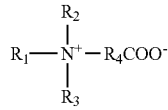

wherein $R_1$ is $R_9CONH(CH_2)_b$ or $R_9$ and $R_9$ is an alkyl group that contains from about 11 to about 24, preferably 11 to 17, carbon atoms; $R_2$, $R_3$ and $R_4$ are as defined above; and b is from 1 to 4, preferably 1 to 3.

Specific examples include those betaines of the structural formulae:

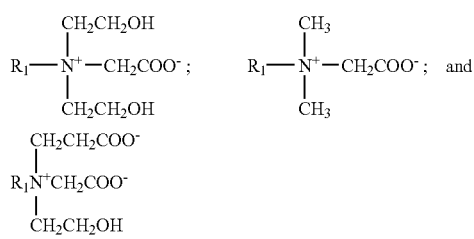

especially where $R_1$ is $R_9CONHCH_2CH_2CH_2$— or $R_9CONHCH_2CH_2$—, wherein $R_9$ is as defined above;

(b) aminocarboxylate derivatives of the formula

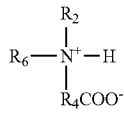

wherein $R_6$, $R_2$ and $R_4$ are as defined above.

Preferred are aminopropionates of the formulae

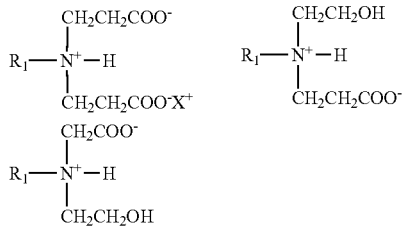

especially where $R_1$ is $R_9CONHCH_2CH_2CH_2$— or $R_9CONHCH_2CH_2$—, wherein $R_9$ is as defined above; X is halogen, preferably chlorine or bromine, or hydrogen; and (c) amine oxides of the formula:

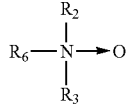

wherein $R_2$ and $R_3$ and $R_6$ are as defined above.

Most preferred are alkylamidoalkylamine oxides, such as those of the formula:

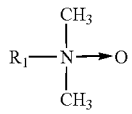

wherein $R_1$ is as defined above.

The alcohols in the composition are preferably polyols. The polyol is used as a solvent. Such solvents are of assistance in keeping the viscosifying polymer dispersed in the composition and to prevent it from decomposing while being subjected to the extreme conditions offered by deep wellbores. In addition, the polyol serves to reduce the thermal conductivity of the composition and thus imparts thermal insulation to the composition.

The polyol is preferably glycerol, a glycol or a polyglycols and mixtures thereof. The glycols include commonly known glycols such as ethylene glycol, propylene glycol and butylene glycol. The polyglycols can be selected from a wide range of known polymeric polyols that include polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers. A wide variety of polyglycols is commercially available. Most commercially available polyglycols include polyethylene glycol, and are usually designated by a number that roughly corresponds to the average molecular weight. Examples of useful commercially available polyethylene glycols include polyethylene glycol 4000 and polyethylene glycol 6000. Preferably the polymeric polyols for use in the present invention are selected to have a number average molecular weight, $M_n$, of about 150 to about 18,000 Daltons. More preferably, the polymeric polyols are selected to have number average molecular weight of about 190 to about 10,000 D. Yet most preferably, the polymeric polyols are selected to have number average molecular weight of about 500 to about 8,000 D. The composition used in the invention will typically contain between from about 2 to about 10 volume percent of polyol.

Use of polyglycols having the described number average molecular weight in the present invention provide a fluid that exhibits stable rheological properties especially at elevated temperatures and over extended periods of time. These polyglycols are particularly well suited for deep wellbores that exert high temperature and pressures on fluids.

Viscosifying polymers are not necessary to practice this invention. Further, it is possible for the insulating fluid to contain no water. When present, suitable viscosifying polymers include those which may be crosslinkable and preferably include polysaccharides, anionic as well as nonionic, such as guar gums and derivatives, cellulose, starch, and galactomannan gums as well as polyvinyl alcohols, polyacrylates, polypyrrolidones and polyacrylamides and mixtures thereof. In addition, the viscosifying polymer of the invention may be a block or random copolymer containing units selected from vinyl alcohol, acrylates, including the (meth) acrylates, pyrrolidone, 2-acrylamido-2-methylpropane sulfonate and acrylamide including the (meth)acrylamides.

Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose. The polysaccharides also include microbial polysaccharides such as xanthan, succinoglycan and scleroglucan as well as galactomannan gums and derivatized galactomannan gums. Specific examples of polysaccharides include but are not limited to guar gum, hydroxypropyl guar, carboxymethylhydroxypropyl guar (CMHPG) and known derivatives of these gums.

When present, the viscosifying polymer in the thermal insulating composition is in a range between from about 0.1 to about 5, preferably from about 1 to about 3, weight percent. The viscosifier provides a fluid having a viscosity sufficient to reduce the convection flow velocity within the annulus.

The zwitterionic surfactant and, if desired, the viscosifying polymer and, when further desired, alcohol, are typically added to the water and/or brine. In a preferred embodiment, surfactant and the viscosifying polymer are added to the alcohol which is then mixed with the aqueous brine. In one embodiment of the present invention, the fluid is substantially free of water.

Preferably, the thermal insulating composition of the invention contains from about 20 to about 99 weight percent water or brine. The brine may be saturated or unsaturated brine. By saturated brine, it is understood that the brine is saturated with at least one salt. Suitable brines include salt solution from NaCl, NaBr, sodium formate, potassium formate, $CaCl_2$, $CaBr_2$, $ZnCl_2$, $ZnBr_2$, etc., or a mixture thereof. The composition is particularly useful with heavy based brines, such as those in excess of 12.5 or 13.0 and even 14.0 lb/gal brines, such as $CaBr_2$, $CaBr_2/CaCl_2$, $ZnBr_2/CaBr_2$ and $ZnBr_2/CaBr_2/CaCl_2$ based brines.

The thermal insulating composition of the invention is prepared on the surface and then pumped through tubing in the wellbore or in the annulus. In a preferred embodiment, the fluid is a packer or riser fluid and the packer fluid is introduced above the packer in an annulus and the riser fluid is introduced into a riser annulus.

The composition, when pumped into an annuli surrounding the production tubing or transfer piping, enhances the thermal insulating quality around the tubing or piping, thereby reducing heat loss from it. The composition further provides high viscosity at low shear rate so as to reduce the rate of fluid convection to near zero. Since convection is fluid motion caused by the variation of fluid density with temperature, increasing fluid viscosity decreases fluid motion, and correspondingly, decreases free annular convection. Thus, the desired rheological profile for the insulating fluid of the invention includes high viscosity at low shear rate in order to reduce the free fluid convection caused by temperature differential. Additionally, a low viscosity at high shear rate is desired to facilitate the placement of the insulating fluid at the desired location.

The thermal insulating compositions should be approached on a specific project basis to meet a target objective in terms of viscosity and density. Density is normally dictated by the required hydrostatic pressure needed to control the well, and may be achieved by the amount and type of salt dissolved within the composition (resulting from the brine, etc). The densities of the thermal insulating compositions of the invention are controlled by operational considerations such as additives to the fluids, hydration time of viscosifier, and requirements for low crystallization temperatures (both true crystallization temperature (TCT) and pressure crystallization temperature (PCT).

The thermal insulating composition of the invention may be produced in shore-based facilities, transported to, and pumped from marine well-servicing boats into riser annuli. This provides a convenient means to blend, temporarily store, and then pump large quantities of fluid into the wellbore and riser annuli, without using rig tanks.

The thermal insulating composition of the invention further offers environmental benefits since no oil sheen will be produced if the composition is spilled since the composition is oil-free. Further, while the fluid compositions vary according to specific well conditions, the components of the composition are environmentally friendly especially since the composition is solids-free.

The composition of the invention may serve a dual purpose. First, they serve to prevent heat transfer/buildup in the outer annuli. Second, they serve to retain heat within the produced hydrocarbons. The compositions further provide lower viscosity at high shear rate to facilitate the fluid placement.

The following example will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLE

A thermal insulating fluid (Fluid A) was prepared by admixing approximately 8.5% by volume of oleylamidopropyl betaine surfactant, commercially available as Rewoteric AM TEG from Degussa), 2.2% by volume of propylene glycol, and approximately 89% by volume $CaBr_2$ brine (14.2 lb/gal).

To demonstrate the effectiveness of the fluid, the thermal insulation properties of the fluid systems were evaluated in a laboratory sized heat transfer apparatus which consisted of three concentric aluminum tubes connected and scaled by two flanges, as set forth in Paul Javora, et al. "Water-Based Insulating Fluids for Deep-Water Riser Applications," SPE 88547, presented at the SPE Asia Pacific Oil and Gas Conference and Exhibition in Perth, Australia, 18-20 Oct. 2004. The conditions simulated the fluid's dynamic behavior under thermal stress in a simulated wellbore. The results are present in Table 1, wherein higher heat transfer coefficient and higher effective thermal conductivity translate into greater heat losses from a hot annulus through the insulating fluid into cold annulus. The thermal insulating fluid used in the invention is compared to an insulation fluid taught in U.S. Pat. No. 6,489,270 containing 4 pound per barrel of carboxymethyl hydroxypropyl guar (CMHPG) and 9.0 ppg sodium brine and commercially available through BJ Services Company as InsulGel™ packer fluid.

TABLE I

Thermal Properties of Different Systems

| | NaBr brine | InsulGel | Fluid A |
|---|---|---|---|
| Heat transfer coefficient U (btu/hr. ft². F.) | 30.8 | 3.03 | 3.04 |
| Effective thermal conductivity K (but/hr. ft. F.) | 3.44 | 0.34 | 0.34 |

Fluid A is an effective insulating fluid at high density brines as InsulGel.

The cool-down rates of Fluid A and InsulGel were compared and are set forth in FIG. 1. Slower cool-down rate from high temperature to low temperature illustrates the effectiveness of the insulating fluid. Fluid A exhibits a slower cool down than that of sodium bromide brine and is better than InSulGel.

From the foregoing, it will be observed that numerous variations and modifications may be effected without departing from the true spirit and scope of the novel concepts of the invention.

What is claimed is:

1. A method for enhancing the thermal insulation of a production tubing or transfer pipe surrounded by at least one annuli, comprising:
   (a) adding to the at least one annuli a thermal insulating fluid comprising:
      (i) a zwitterionic surfactant;
      (ii) an alcohol; and
      (iii) a brine;
and
   (b) maintaining the fluid in contact with the at least one annuli to at least partially immobilize the fluid.

2. The method of claim 1, wherein the zwitterionic surfactant is selected from:
   (a) betaines of the formula:

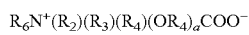
   $R_6N^+(R_2)(R_3)(R_4)(OR_4)_aCOO^-$ (b) aminocarboxylate derivatives of the formula:

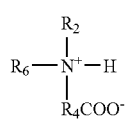

and
   (c) amine oxides of the formula:

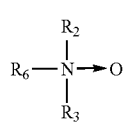

wherein $R_6$ is an alkyl, alkylarylalkyl, alkoxyalkyl, alkylaminoalkyl, alkylamidoalkyl or alkylamidoalkoxy group wherein the number of carbon atoms in $R_6$ is between from about 11 to about 24;

$R_2$ and $R_3$ are independently an alkyl, alkenyl, arylalkyl, hydroxyalkyl, carboxyalkyl, alkylene carboxylic or hydroxyalkyl-polyoxyalkylene having from 1 to about 30 carbon atoms;

each $R_4$ is independently a $C_1$-$C_4$ alkylene group; and a is from 0 to about 4.

3. The method of claim 2, wherein $R_2$ and/or $R_3$ contain between from about 1 to about 6 carbon atoms.

4. The method of claim 2, wherein the betaine is of the structural formula:

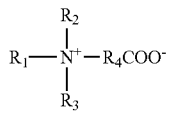

wherein $R_1$ is $R_9CONH(CH_2)_b$ or $R_9$, $R_9$ is an alkyl group that contains from about 11 to about 24 carbon atoms and b is from 1 to 4.

5. The method of claim 4, wherein $R_9$ is a $C_{11}$-$C_{17}$ alkyl group.

6. The method of claim 5, wherein the betaine is selected from the formulae:

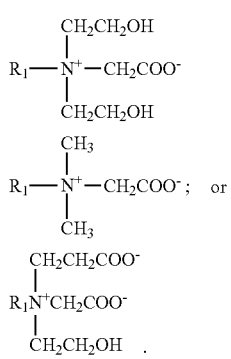

7. The method of claim 2, wherein the zwitterionic surfactant is an aminopropionate of the formulae

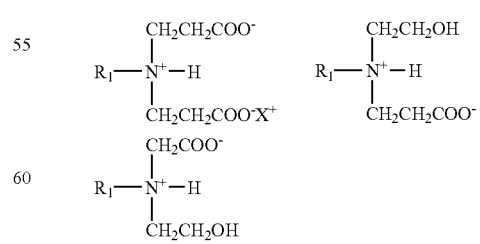

wherein X is halogen or hydrogen; $R_1$ is $R_9CONH(CH_2)_b$ or $R_9$; $R_9$ is an alkyl group that contains from about 11 to about 24 carbon atoms; and b is from 1 to 4.

8. The method of claim 2, wherein the amine oxide is of the formula:

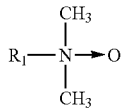

wherein $R_1$ is $R_9CONH(CH_2)_b$ or $R_9$. $R_9$ is an alkyl group that contains from about 11 to about 24 carbon atoms; and b is from 1 to 4.

9. The method of claim 1, wherein the density of the brine is greater than 12.5 lb/gal.

10. The method of claim 9, wherein the density of the brine is greater than 13.0 lb/gal.

11. The method of claim 10, wherein the density of the brine is greater than 14 lb/gal.

12. The method of claim 11, wherein the brine is a calcium brine.

13. The method of claim 1, wherein the alcohol is a polyol selected from a glycerol, glycol or polyglycols or a mixture thereof.

14. The method of claim 13, wherein the polyol is polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers or a mixture thereof.

15. The method of claim 1, wherein the amount of alcohol in the thermal insulating composition is between from about 2 to about 10 volume percent.

16. A method for reducing convection flow velocity in at least one annuli surrounding a production tubing or transfer pipe, comprising:
introducing into the at least one annuli an insulating packer or riser fluid comprising a thermal insulating composition comprising:
(i) a zwitterionic surfactant;
(ii) an alcohol; and
(iii) a brine;
and
maintaining the fluid in the at least one annuli until the convection flow velocity is reduced.

17. The method of claim 16, wherein the insulating fluid, as a packer fluid, is introduced above the packer in the annulus and, as a riser fluid, is introduced into the riser annulus.

18. The method of claim 16, wherein the zwitterionic surfactant is selected from:
(a) betaines of the formula:

$R_6N^+(R_2)(R_3)(R_4)(OR_4)_aCOO^-$ (b) aminocarboxylate derivatives of the formula:

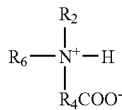

(c) amine oxides of the formula:

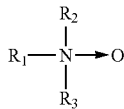

wherein $R_6$ is an alkyl, alkylarylalkyl, alkoxyalkyl, alkylaminoalkyl, alkylamidoalkyl or alkylamidoalkoxy group wherein the number of carbon atoms in $R_6$ is between from about 11 to about 24;
$R_2$ and $R_3$ are independently an alkyl, alkenyl, arylalkyl, hydroxyalkyl, carboxyalkyl, alkylene carboxylic or hydroxyalkyl-polyoxyalkylene having from 1 to about 30 carbon atoms;
each $R_4$ is independently a $C_1$-$C_4$ alkylene group; and
a is from 0 to about 4.

19. The method of claim 18, wherein $R_6$ is a $C_{11}$-$C_{17}$ alkyl group.

20. The method of claim 19, wherein $R_2$ and/or $R_3$ contain between from about 1 to about 6 carbon atoms.

21. The method of claim 18, wherein the betaine is of the structural formula

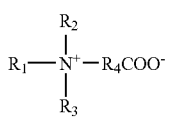

wherein $R_1$ is $R_9CONH(CH_2)_b$ or $R_9$; $R_9$ is an alkyl group that contains from about 11 to about 24 carbon atoms; and b is from 1 to 4.

22. The method of claim 21, wherein the betaine is selected from the formulae:

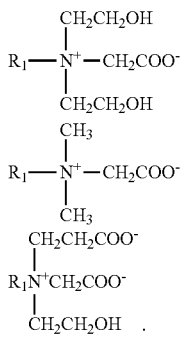

23. The method of claim 18, wherein the zwitterionic surfactant is an aminopropionate of the formulae

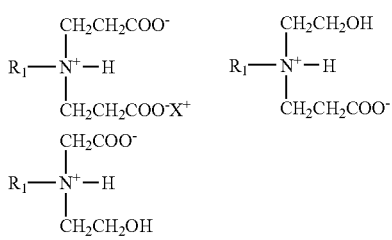

wherein X is halogen or hydrogen; $R_1$ is $R_9CONH(CH_2)_b$ or $R_9$; $R_9$ is an alkyl group that contains from about 11 to about 24 carbon atoms; and b is from 1 to about 4.

24. The method of claim 18, wherein the amine oxide is of the formula:

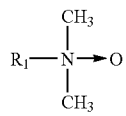

wherein $R_1$ is $R_9CONH(CH_2)_b$— or $R_9$; $R_9$ is an alkyl group that contains from about 11 to about 24 carbon atoms; and b is from 1 to about 4.

25. The method of claim 16, wherein the density of the brine is greater than 12.5 lb/gal.

26. The method of claim 25, wherein the density of the brine is greater than 13.0 lb/gal.

27. The method of claim 25, the brine is a calcium brine.

28. The method of claim 16, wherein the alcohol is a polyol selected from a glycerol, glycol or polyglycols or a mixture thereof.

29. The method of claim 28, wherein the amount of alcohol in the thermal insulating composition is between from about 2 to about 10 volume percent.

* * * * *